(12) United States Patent
Kempski et al.

(10) Patent No.: US 7,360,474 B1
(45) Date of Patent: Apr. 22, 2008

(54) FIBER CHOPPER AND METHOD OF CHOPPING

(75) Inventors: Douglas J. Kempski, Holland, OH (US); Michael David Folk, Oregon, OH (US)

(73) Assignee: Johns Mnaville, Denver, CO (US)

( * ) Notice: Subject to any disclaimer, the term of this patent is extended or adjusted under 35 U.S.C. 154(b) by 506 days.

(21) Appl. No.: 10/919,575

(22) Filed: Aug. 17, 2004

(51) Int. Cl.
*B26D 5/08* (2006.01)

(52) U.S. Cl. .............................. 83/98; 83/102; 83/105; 83/436.6; 83/913; 83/950

(58) Field of Classification Search .................. 83/105, 83/109, 111, 113, 158, 159, 160, 162, 165, 83/166, 913, 950, 436.6, 436.1, 102, 98, 83/99; 264/115, 121
See application file for complete search history.

(56) References Cited

U.S. PATENT DOCUMENTS

| | | | |
|---|---|---|---|
| 3,508,461 A | 4/1970 | Stream | |
| 3,826,903 A * | 7/1974 | Varrasso | 700/9 |
| 3,869,268 A | 3/1975 | Briar et al. | |
| 3,873,290 A * | 3/1975 | Marzocchi | 65/480 |
| 4,083,279 A | 4/1978 | Wester et al. | |
| 4,194,896 A * | 3/1980 | Symborski et al. | 65/377 |
| 4,249,441 A | 2/1981 | Sturtz | |
| 4,287,799 A | 9/1981 | Fujita et al. | |
| 4,398,934 A | 8/1983 | Willis et al. | |
| 4,551,160 A | 11/1985 | Frailey et al. | |
| 5,773,745 A * | 6/1998 | Widmer | 89/1.11 |
| 5,970,837 A | 10/1999 | Arterburn | |
| 6,325,605 B1 * | 12/2001 | Clements et al. | 425/83.1 |
| 6,564,684 B2 * | 5/2003 | Bascom et al. | 83/105 |

* cited by examiner

*Primary Examiner*—Boyer D. Ashley
*Assistant Examiner*—Omar Flores-Sanchez
(74) *Attorney, Agent, or Firm*—Robert D. Touslee

(57) ABSTRACT

A method and apparatus for chopping long unwound items like fiber, fiber strands, yarn, etc. The chopper has a backup roll, a blade roll and an idler roll. The improvements include one or both of a shield having an air jet at or near its upper end, the shield being upstream of the blade roll and spaced from the blade roll, a lower end of the shield being spaced from the working surface, the air jet communicating with a source of compressed air, to prevent a buildup of fuzz or chopped item(s) upstream of the blade roll, and a shield having an air jet at or near its upper end, the air jet being located close to the working surface and the shield angling or curving downward from a location spaced from the working surface beginning between about an 8 O'clock and a 10 o'clock position on the backup roll and transitioning generally downward ending at a location below and spaced from the idler roll to protect the idler roll from chopped item(s).

23 Claims, 4 Drawing Sheets

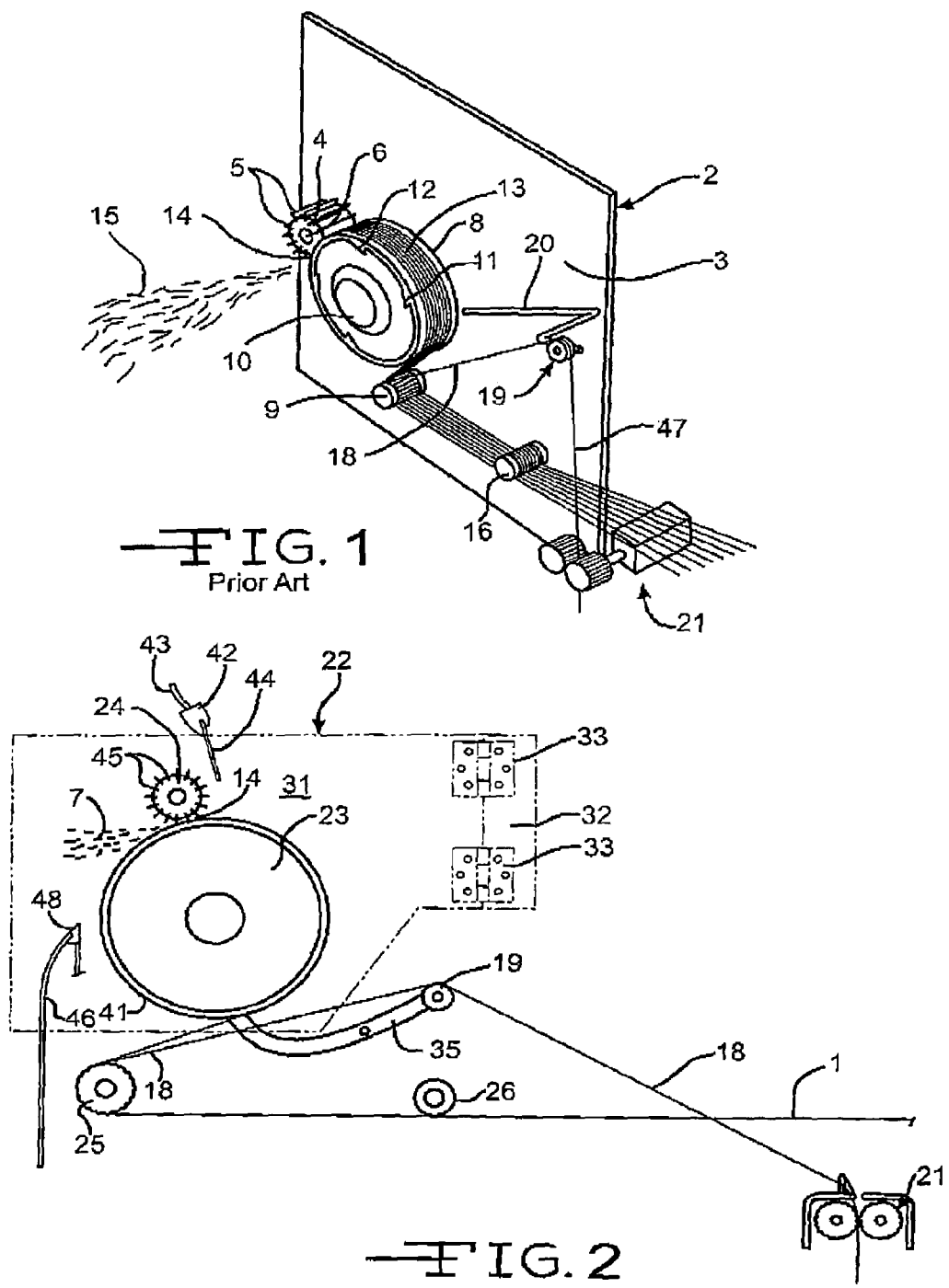

FIBER CHOPPER AND METHOD OF CHOPPING

BACKGROUND

The present invention involves an improved chopper for chopping continuous or very long loose items such as fiber, fiber strands, yarn, wire, string, ribbon, tape and the like by pulling the item(s) into the chopper while the loose items are held tightly against the surface of a rotating backup roll and carrying the item(s) on into a nip between a rotating blade roll and the rotating backup roll where they are separated into short pieces. More specifically the present invention involves a chopper having improved mechanisms and features.

It has long been known to chop continuous fibers or fiber strands into short lengths of about 3 inches or shorter. Billions of pounds of such product including chopped glass fibers and fiber strands are produced each year in process and chopping apparatus such as disclosed in U.S. Pat. Nos. 5,970,837, 4,551,160, 4,398,934, 3,508,461, and 3,869,268, the disclosures of which are incorporated herein by reference. The choppers disclosed in these patents comprise a blade roll containing a plurality of spaced apart blades for separating the fibers into short lengths, a backup roll, often or preferably driven, which the blades work against to effect the separation and which pulls the fibers or fiber strands and in some cases, an idler roll to hold the fibers or fiber strands down onto the surface of the backup roll. In the chopped fiber processes disclosed in these patents, the chopper is often the item most limiting the productivity of the processes. These processes typically operate continuously every day of the year, 24 hours each day, except for furnace rebuilds every 5-10 years.

The above choppers must be serviced every few hours, shifts or days, depending on the type of material being chopped, to replace a worn backup roll, a blade roll, or both and sometimes other components of the chopper. These service shutdowns of the chopper often mean that all of the bushings being served by the chopper are not only disrupted, but do not produce any salable product until the chopper is again running and the strands from each of the bushings have been restarted into the chopper. It usually takes 10-15 or more minutes to stop and service the chopper and to restart all of the 5-14 bushings that are normally served by the chopper. The fiberizing bushings usually do not run well for the first hour or two after a chopper service shutdown because the bushings loose their temperature equilibrium and uniformity during the disruption and it takes a period of time to regain the desired equilibrium. During this time the productivity is also reduced and the manual labor demand is increased.

Any improvement in the chopper that would allow the chopper to pull and chop faster and/or for longer times between service shutdowns, and/or to pull and chop more fibers or fiber strands at a time would have an extremely positive impact on productivity and production costs. The invention comprises improvements to the type of chopper shown in U.S. Pat. No. 4,551,160. Problems exist with this type of chopper that cause interruptions in production limiting productivity and causing higher than necessary manufacturing costs. Some of these problems are strand breakage in the chopper prior to chopping and resulting roll wraps. Each running strand, due to the high speed it is being pulled and the nature of the strand, is subject to being broken by interference from the loose end of a broken strand, fuzz clumps comprised of a web of chopped or broken fibers, and the worn, rough surface of the backup roll. When a strand breaks, the productivity of the fiberizing bushing is lost for a few minutes until the bushing beads down and the resulting new fiber strand is started back into the chopper. Also, too frequently, when a strand breaks at the chopper, an idler roll wrap or a strand guide roll wrap resulting in or requiring most or all of the strands to be broken out, the wrapped roll cleared of the wrapped strand or strands, and each of the fiber strands from each of the fiberizing bushings laced back into the chopper. Typical production time lost for the entire bushing leg from a roll wrap is about 10 minutes.

SUMMARY OF THE INVENTION

The present invention is an improved chopper for separating long lengths of one or more unwound items selected from a group consisting of fibers, fiber strands, wires, strings, tape(s), strip(s) and ribbon(s) into short lengths. One or more of, preferably a plurality of, the long lengths of material are pulled into the chopper in an unwound form at speeds exceeding 1,000 FPM, preferably at speeds exceeding 2000 FPM, first by the peripheral surfaces of a pair of pull rolls and subsequently by a working surface of a moving elastomer layer on the peripheral surface of a rotating backup roll. The latter carries the item(s) on into a nip between the elastomer layer and a rotating blade roll. The improvement comprises one or any combination of the following:

a) one or more air nozzles and a shield combination in front of the cutter head to remove a cause of roll wraps on the idler roll, and b) a shield and one or more air nozzles combination located downstream of the blade roll and extending close to the backup roll to protect idler roll.

The invention also includes a method of chopping items as described above using the improved chopper described above having novel improvements as described above to separate the items into short lengths while optimizing backup roll working layer life and blade life and also increasing chopping speed and productivity.

When the word "about" is used herein it is meant that the amount or condition it modifies can vary some beyond that so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term about as used herein. It is not difficult for the skilled artisan or others to determine whether such an embodiment is either as might be expected or, because of either a break in the continuity of results or one or more features that are significantly better than reported by the inventor, is surprising and thus an unobvious teaching leading to a further advance in the art.

BRIEF DESCRIPTION OF THE DRAWINGS

FIG. 1 is an elevational perspective view of a portion of a prior art chopper.

FIG. 2 is an elevation view of a portion of the chopper of the present invention showing the several improvements described herein.

DETAILED DESCRIPTION OF THE INVENTION

Figure 3:
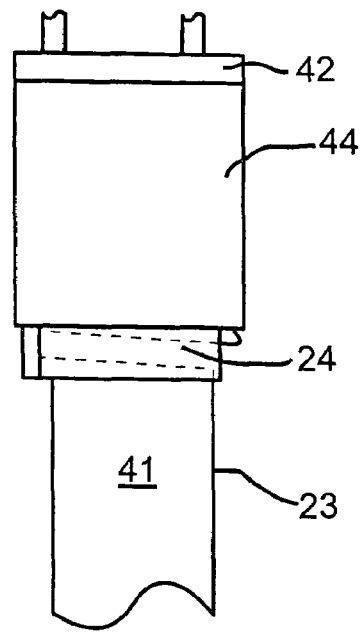
FIG. 3 is an elevation side view of a portion of the chopper showing a shield and air jet combination for protecting the blade roll area.

FIG. 1 shows a front elevation perspective view of a portion of a prior art chopper 2, of the type shown in U.S. Pat. No. 4,551,160, and that is used in making chopped strand glass fiber. It comprises a front plate 3, a blade roll 4 with spaced apart blades 5 contained in slots and projecting from the periphery of an integrated hub 6, a backup roll 8 and a free-wheeling idler roll 9. The blade roll 6 is usually made entirely of metal, but can be made using a thermoplastic material to hold spaced apart blades such as the blade rolls shown in U.S. Pat. Nos. 4,083,279, 4,249,441 and 4,287,799, the disclosures of which are herein incorporated by reference.

The backup roll 8 is held on a spindle (not shown) with a hub 9 and also has a metal rim 11 on which is a notch and projection 12 for starting a new strand 7 of fibers into the chopper. The backup roll 8 is biased against the blade roll 4 until the blades 5 press into the working layer of the backup roll 8 a proper amount forming a nip 14 to break or separate fiber strands 1 into an array of short length or chopped strands 15.

One or more, usually 5 or more and up to 14 or more strands 1, such as glass fiber strands, each strand containing 400-6000 or more fibers and usually having water and/or an aqueous chemical sizing on their surfaces, are pulled by the backup roll 8 into the chopper 2 and the nip 14. The strands 1 first run under a grooved guide roll 16, preferably with one or two strands 1 in each groove, and upward and over a working surface 13 of the backup roll 8, i.e. the exposed peripheral surface of the backup roll 8 on which the running strands 1 lay against and are supported while being severed by blades 5 on the blade roll 4. The working surface of the back up roll 8 is typically wider than the oscillating path of the glass fiber strands 1. The strands 1 then pass under the outer surface of the free-wheeling idler roll 9, which is located to provide sufficient contact of the strands 1 on the surface of the backup roll 8 to enable the latter to pull the glass fiber strands 1.

When a new strand 18 is ready to be started into the prior art chopper it is pulled to the front of the chopper 2 by the operator and pulled under the separator roll 16 and the idler roll 9 and up over a free-wheeling starter roll 19 attached to the end of a pivoting arm 20 and down between a nip of a pair of driven pull rolls, part of a conventional pull roll assembly 21, that pull the new strand 18 at a first low speed and deliver the new strand into a scrap handling process, a scrap bin or a scrap basement. After the new strand 18 is being pulled by the pull roll assembly 21 at a low initial speed, the pull rolls 21, the pulling speed of the pull rolls 21 is ramped up to bring the new strand 18 to at least close to the speed of the strands 1 running into the chopper 2. When that speed is reached, the pivot arm 20 is pivoted counter-clockwise to start the new strand 18 into the chopper 2 in the manner disclosed in U.S. Pat. No. 4,551,160.

The improvements to the chopper, according to the present invention, are shown in FIG. 2 and in more detail in other figures described below. The chopper 22 comprises a frame 32, a front wall 31 and in front of the front wall are a backup roll 23 having a working surface 41, a blade roll 24 with a plurality of spaced apart blades 45, moved to a position to discharge the chopped strands 7 in a generally diagonal direction, an idler roll 25, a starter arm 35 and a starter roll 19.

In the prior art choppers fragments of the item(s) being chopped, such as fiber fuzz, builds up around the blade roll 24 and the safety shield 31 in the area of the blade roll 24. To address this problem it is known to occasionally purge the area with a water flush, but this does not remove all the fiber and the build up remaining is very wet and wears on the working surface 41 of the backup roll 23. This condition also keeps the working surface 41 wetter than desired.

Figure 5:
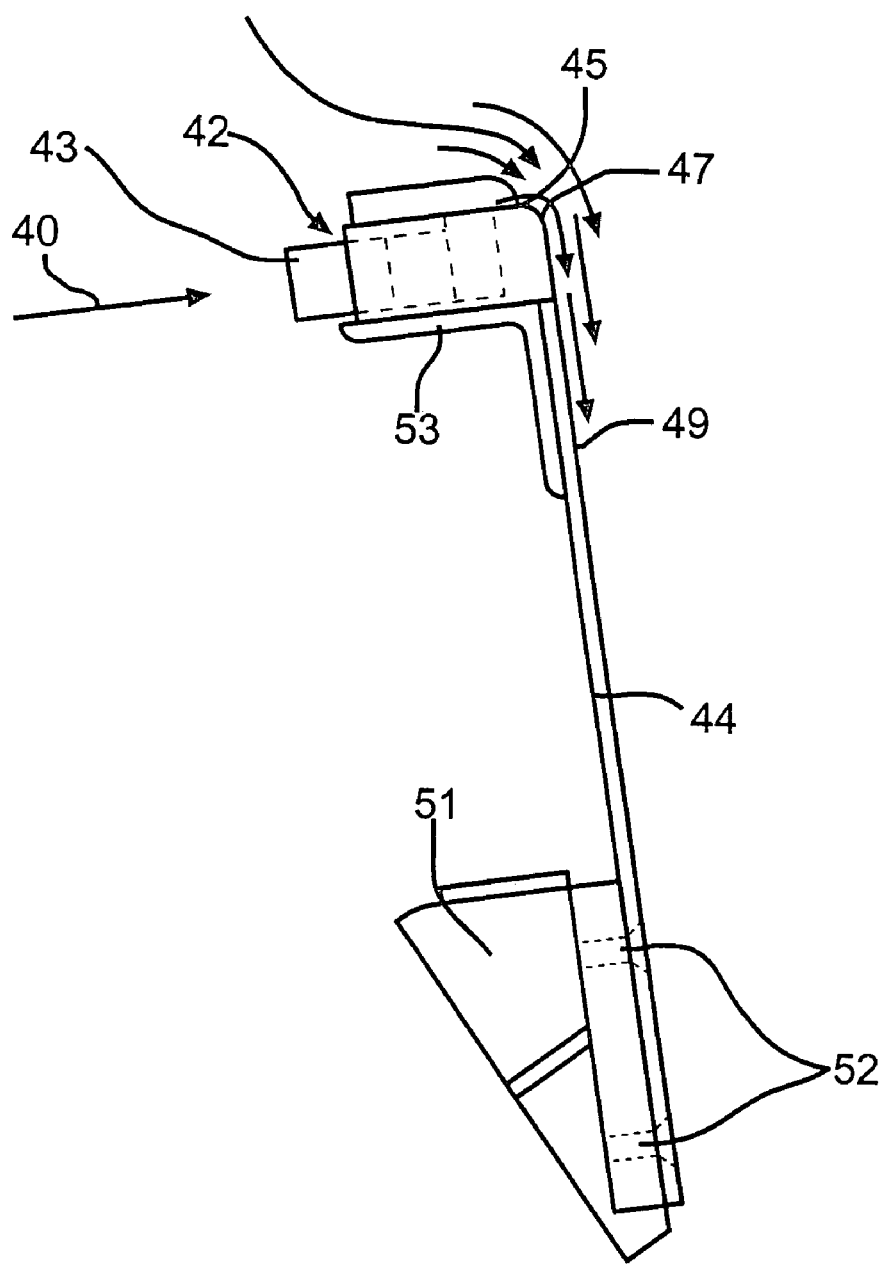
FIG. 5 is a front elevation of an inventive feature shown in FIG. 3.

A feature of the present invention is shown in FIGS. 2, 3 and 5 and comprises one or more air nozzles, preferably a conventional air knife 42 mounted along the top edge of a shield 44 that is mounted above and in front of the blade roll 24 to keep the approach to the blade roll clear for the lacing in of a new strand, to keep fuzz clumps from wearing the surface of the backup roll 23 and to reduce excess moisture on the running strands. Compressed air 40 is supplied to the air knife 42 with one or more hoses 43. The compressed air 40 jets from the air knife 42 through a small slot 45, preferably having a gap of about 0.002 inch, above a curved front nose 47 that straightens and becomes flush with a front face 49 of the shield 44. The shield 44 is preferably generally centered in front of the blade roll 24, is wider than the blade roll 24 is long and preferably is at least twice as wide. The shield 44 can be mounted to a front wall 3 of the chopper 22 with any type of bracket, such as a bracket 51 shown in FIG. 5 with one or more screws or bolts 52, and the air knife 42 can be attached to or near an upper edge of the shield 44 in any suitable manner, such as with an angle 53 attached to the air knife 42 and back of the shield 44 in a conventional manner. The high velocity air escaping from the slot 45, and ambient air inspirited by this high velocity jet, tends to follow the curved nose 47 remaining close to the front face 49 of the shield 44 to remove any fiber or fuzz clumps that normally build up around the blade roll 24.

The air knife 42 is activated, preferably automatically for a desired elapsed time only periodically, such as every 5-30 minutes depending upon the type of product being chopped and the rate of generation of stray fiber and fuzz clumps. The elapsed time of the air purge is preferably at least about 2 seconds and most preferably about 5 seconds. This preferably occurs during or just before a conventional water purge of the blade roll.

The air knife 42 has an elongated slot 45 adjacent the front face 49 of the shield 44. The elongated slot preferably has a width of at least about 8 inches and preferably a width of about 10 inches, but these widths can vary depending upon the width shield 44. Preferably the shield has a width of about 13 inches to about 15 inches, but can be narrower or wider depending upon the width of the backup roll and blade roll. Compressed air is delivered to the air knife 42 through an air hose 43, preferably at a pressure of at least about 90 psi, most preferably at about 110 psi. The shield 46 and air knife 48 are preferably made of a non-corrosive material, most preferably stainless steel. The shield 46 has a width that is at least as wide as the backup roll 23 and preferably that is wider, most preferably at least about 4 inches wider than the backup roll 23, with its centerline in alignment with the centerline of the working surface 41.

Figure 4:
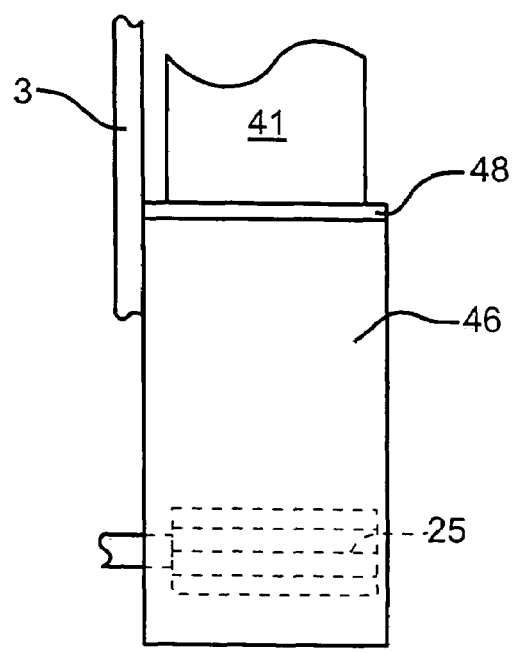
FIG. 4 is a side elevation view of a shield and air jet combination for protecting the idler roll.
Figure 6:
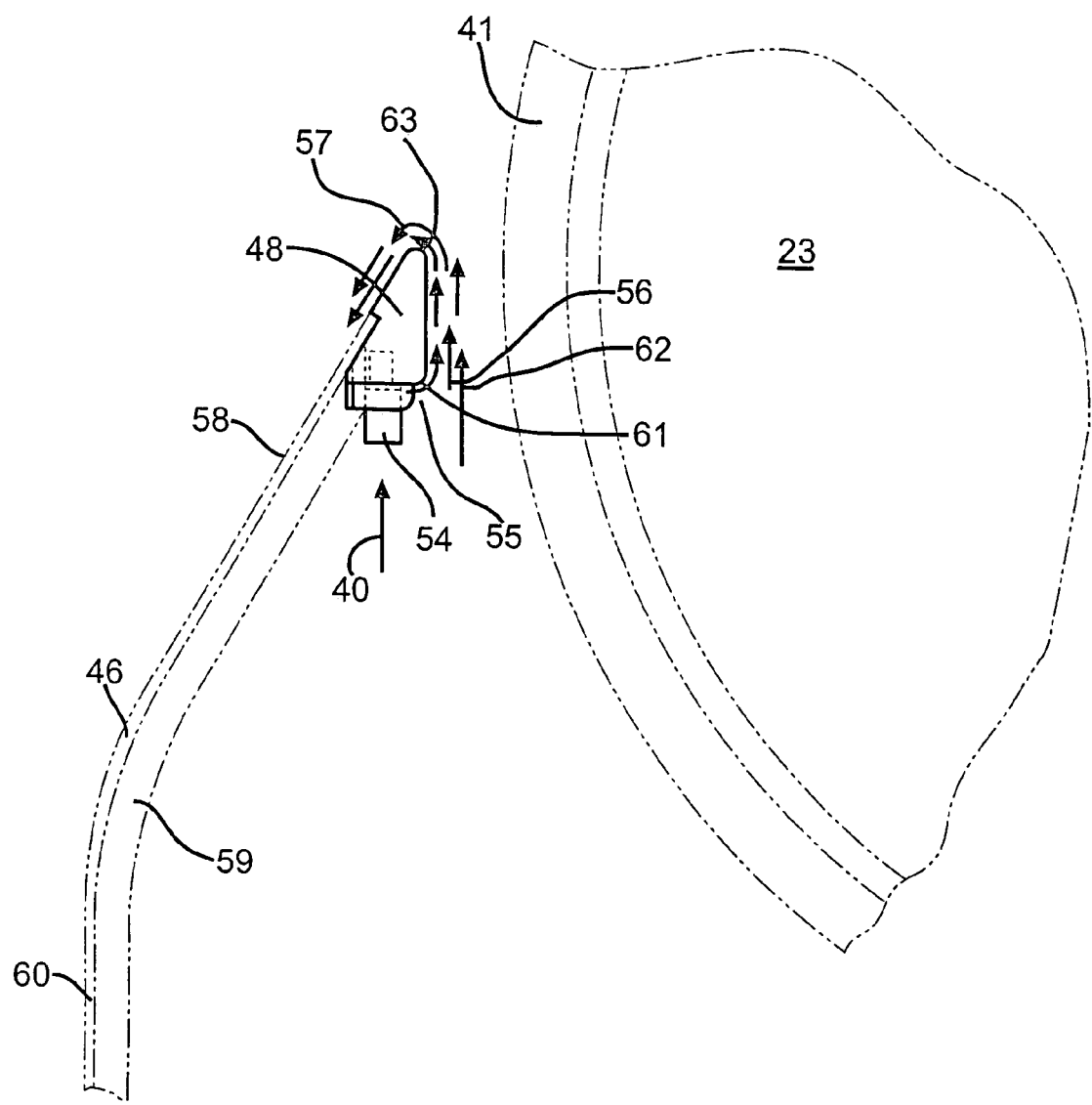
FIG. 6 is a front elevation of an inventive feature shown in FIG. 4.

Located downstream of the discharge of the chopped item(s) 7 and shown in FIGS. 2, 4 and 6 is another shield 46 with an air knife 48 located at an upper end of the shield 46 to keep the upper surface of the shield 46 clean. Preferably the air knife 48 is located along an upper edge of the shield 46, preferably at a location of between about 8 and 10 o'clock with respect to the backup roll 23, most preferably about 9 O'clock position off the backup roll 23 and close to the working surface 41 of the backup roll 23. Compressed air 40 is fed to the air knife 48 through a hose 54. The air knife 48 emits a jet 61 of high velocity air out of a small slot 55 extending along the width of the air knife 48, the slot 55 preferably having an opening gap of about 0.002 inch. The high velocity jet of air 61, and a flow of ambient air 62 inspirated by the jet of air 61, tends to stay close to a curved heel 56 and a sharply curved nose 63 of the air knife 48, which mates with the upper edge of the shield 46 to form a continuous surface 58. The shield 46 is preferably centered on the width of the backup roll 23, is wider than the backup roll 23 and preferably is at least twice as wide as the backup roll 23. The shield 46 preferably has a width of at least about 8 inches and preferably 10 inches or more, angles or curves down and away as it moves away from the air knife 48, preferably transitioning to a vertical portion 60 of the shield 46 that extends downward past the item(s) turning around the idler roll 25, ending at a distance spaced vertically lower than the idler roll 25. If desired, an optional stiffener 59 can be attached to a backside of the shield 46 to maintain the shape and reduce vibration of the shield 44.

The air knife 48 preferably exhausts elevated pressure air at a high velocity full time, i.e. this air knife 48 preferably operates whenever the chopper is running, or at least as long as the chopper is chopping fiber. The air knife 48 has an elongated slot 55 behind the front face 58 of the shield 46. The elongated slot preferably has a width of at least about 8 inches and preferably a width of about 10 inches. Compressed air is delivered to the air knife 48 through the air hose 54, preferably at a pressure of at least about 90 psi, most preferably at about 110 psi. The air knife 48 and shield 46 prevents fiber build-up between an upper end of the shield 46 and the backup roll 23 eliminating unnecessary backup roll 23 surface wear, cools the surface of the backup roll 23 extending backup roll 23 life, prevents fiber clumps from striking the running strands 1 and idler roll 25 that frequently would cause one or more strands to break, resulting in idler roll wraps.

Given the above disclosure, many other embodiments, modifications, and alternatives to the preferred embodiments described above will be apparent to those of ordinary skill in the art to provide all or most of the same functions and advantages of the disclosed embodiments. Those other embodiments, modifications and alternatives are included in the scope of the claims provided below.

The invention claimed is:

1. A method of separating long lengths of unwound item(s) selected from the group consisting of fibers, fiber strands, string, yarn, wire, tape and ribbon into short pieces comprising feeding one or more items in an unwound form into a chopper comprising a frame, a front wall a rotatable backup roll outboard of one side of the front wall, the backup roll having a peripheral working layer with a working surface, a rotatable blade roll outboard of the front wall, the blade roll having a plurality of blades or sharp edges spaced apart around its periphery for contact with and penetration of said item(s) and said working surface and into the peripheral working layer of the backup roll, and a start up roll located on a pivot arm and an idler roll located vertically lower than the vertically lowest part of the peripheral working layer for the purpose of directing the unwound item(s) onto the peripheral working layer, the improvement comprising:
  placing a downstream shield between the idler roll and the blade roll and spaced from the working surface of the backup roll, an upper end of the shield being close to the working surface and having one or more air jets, the shield extending downwardly and ending at a location that is vertically lower than the bottom of the idler roll, the shield being at least as wide as a working surface of the idler roll and blowing a fluid across a surface of the shield, and operating the chopper to separate the item(s) into short segments.

2. The method of claim 1 wherein the one or more air nozzles of the improvement is an air knife.

3. A chopper for separating long lengths of unwound item(s) selected from the group consisting of fibers, fiber strands, string, yarn, wire, tape and ribbon into short pieces comprising a frame, a front wall, a rotatable backup roll outboard of the front wall, the backup roll having a peripheral working layer with a peripheral working surface, a rotatable blade roll outboard of the side of the front wall, the blade roll having a plurality of blades or sharp edges spaced apart around its periphery for contact with and penetration of said items and said working surface into the peripheral working layer and a start up roll located on a pivot arm and an idler roll located vertically lower than the vertically lowest part of the peripheral working layer for the purpose of directing the unwound item(s) onto the peripheral working layer, the improvement comprising:
  a shield having one or more air nozzles at or near an upper edge to produce an air jet, the air jet being located close to the working surface of the backup roll and the shield angling or curving downward from a location spaced from the working surface beginning at a position that is from about 8 o'clock to about 10 o'clock position off of the backup roll, the shield transitioning generally downward ending at a location below and spaced from the idler roll to protect the idler roll from chopped item(s).

4. The chopper of claim 3 wherein the shield in the improvement is wider than the width of the backup roll.

5. A method of separating long lengths of unwound item(s) selected from the group consisting of fibers, fiber strands, string, yarn, wire, tape and ribbon into short pieces comprising feeding one or more items in an unwound form into a chopper comprising a frame, a front wall a rotatable backup roll outboard of one side of the front wall, the backup roll having a peripheral working layer with a working surface, a rotatable blade roll outboard of the front wall, the blade roll having a plurality of blades or sharp edges spaced apart around its periphery for contact with and penetration of said item(s) and said working surface and into the peripheral working layer of the backup roll, and a start up roll located on a pivot arm and an idler roll located vertically lower than the vertically lowest part of the peripheral working layer for the purpose of directing the unwound item(s) onto the peripheral working layer, the improvement comprising one or both of:
  (a) placing an upstream shield upstream of the blade roll having one or more air nozzles at or near an upper edge of the shield for directing a high velocity air jet along a front face of the shield, the shield being located upstream of the blade roll and spaced from the blade roll, the shield having a lower end spaced from the working surface and periodically blowing a fluid at an elevated velocity across the surface of the shield to prevent a buildup of fuzz or chopped item(s) upstream of and in the vicinity of the blade roll, and (b) placing a downstream shield between the idler roll and the blade roll and spaced from the working surface of the backup roll, an upper end of the shield being close to the working surface and having one or more air jets, the shield extending downwardly and ending at a location that is vertically lower than the bottom of the idler roll, the shield being at least as wide as a working surface of the idler roll and blowing a fluid across a surface of the shield, and operating the chopper to separate the item(s) into short segments.

6. The method of claim 5 wherein the chopper comprises improvement (a).

7. The method of claim 6 wherein the one or more air nozzles of improvement (a) is an air knife.

8. The method of claim 5 wherein the chopper comprises improvement (b).

9. The method of claim 5 wherein the chopper comprises both improvements (a) and (b).

10. The method of claim 9 wherein the one or more air nozzles of both improvements (a) and (b) are air knives.

11. A chopper for separating long lengths of unwound item(s) selected from the group consisting of fibers, fiber strands, string, yarn, wire, tape and ribbon into short pieces comprising a frame, a front wall, a rotatable backup roll outboard of the front wall, the backup roll having a peripheral working layer with a peripheral working surface, a rotatable blade roll outboard of the side of the front wall, the blade roll having a plurality of blades or sharp edges spaced apart around its periphery for contact with and penetration of said items and said working surface into the peripheral working layer, a start up roll located on a pivot arm and an idler roll located vertically lower than the vertically lowest part of the peripheral working layer for the purpose of directing the unwound item(s) onto the peripheral working layer, the improvement comprising one or both of:

(a) a shield having one or more air nozzles at or near an upper edge of the shield for directing a high velocity air jet along a front face of the shield, the shield being located upstream of the blade roll and spaced from the blade roll, a lower end of the shield being spaced from the working surface of the backup roll, the air jet communicating with a source of compressed air to produce the air jet to prevent a buildup of fuzz or chopped item(s) upstream of and in the vicinity of the blade roll, and (b) a shield having one or more air nozzles at or near an upper edge, the air jet being located close to the working surface of the backup roll and the shield angling or curving downward from a location spaced from the working surface beginning at a position that is from about 8 o'dock to about 10 o'clock position off of the backup roll, the shield transitioning generally downward ending at a location below and spaced from the idler roll to protect the idler roll from chopped item(s).

12. The chopper of claim 11 comprising improvement (a).

13. The chopper of claim 12 wherein the one or more air nozzles of improvement (a) is an air knife.

14. The chopper of claim 12 wherein the shield in improvement (a) is wider than the length of the blade roll.

15. The chopper of claim 11 comprising improvement (b).

16. The chopper of claim 15 wherein the one or more air nozzles of improvement (b) is an air knife.

17. The chopper of claim 11 comprising both improvement (a) and improvement (b).

18. The chopper of claim 17 wherein the one or more air nozzles of improvement (a) is an air knife.

19. The chopper of claim 17 wherein the one or more air nozzles of improvement (b) is an air knife.

20. The chopper of claim 17 wherein the one or more air nozzles of both improvements (a) and (b) is an air knife.

21. The chopper of claim 17 wherein the shield in improvement (a) is wider than the length of the blade roll.

22. The chopper of claim 17 wherein the shield in improvement (b) is wider than the width of the backup roll.

23. The chopper of claim 17 wherein the shields in improvements (a) and (b) are wider than the width of the backup roll.

\* \* \* \* \*